June 27, 1961 J. L. SCHMITT 2,989,986
HYDRAULIC CONTROL VALVE FOR ACTUATING
STEERING CLUTCHES OR THE LIKE
Filed April 25, 1958
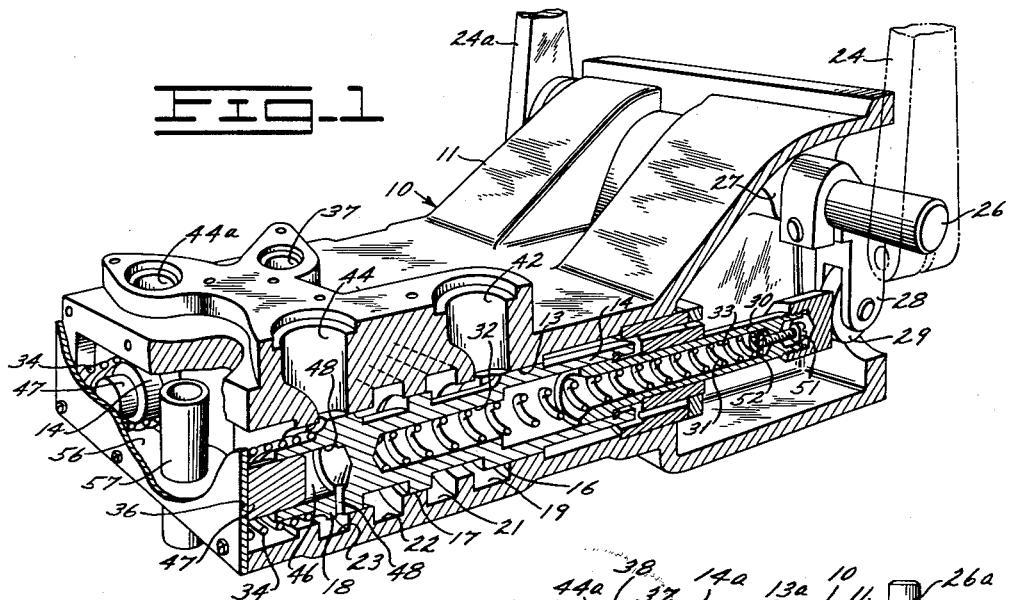
INVENTOR.
JAMES L. SCHMITT
BY
*Fryer and Johnson*
ATTORNEYS

United States Patent Office 2,989,986
Patented June 27, 1961

2,989,986
HYDRAULIC CONTROL VALVE FOR ACTUATING STEERING CLUTCHES OR THE LIKE
James L. Schmitt, Washington, Ill., assignor to Caterpillar Tractor Co., Peoria, Ill., a corporation of California
Filed Apr. 25, 1958, Ser. No. 730,844
4 Claims. (Cl. 137—622)

This invention relates to a hydraulic control mechanism for directing fluid under pressure to one or more hydraulically actuated members.

The present invention is particularly adapted for use in connection with tractor steering clutches or the like that are normally spring urged into engagement and hydraulically actuated to disengage them, and will be disclosed herein in connection with such use. Its adaptability to applications other than this will, however, be readily apparent.

Track-type tractors comprise drive mechanisms which propel each track through individually controllable steering clutches. This principle of steering is known to the art as drive steering wherein as long as each clutch is in the engaged position the drive is transmitted through the gear train equally into each sprocket shaft to propel the tractor along a straight course. Means is usually provided for individually controlling the frictional engagement of the drive clutches so that in traversing a curved path the clutch on the side of the tractor leading into the curve may be disengaged entirely or permitted to slip to allow the operator to select a suitable radius of path curvature by appropriately slipping and/or disengaging the appropriate clutch.

Steering clutches are normally engaged by the force exerted by captive springs which urge the plates into frictional contact. Mechanical means is usually provided to relieve the amount of force exerted by the springs so as to permit controlled slippage of the clutch plates relative to each other, as well as to allow the operator to completely disengage one or the other clutch so as to cause the tractor to make a sharp turn. In some applications hydraulic means have been substituted for the mechanical clutch disengaging mechanism which simplifies the connections required to control the clutches.

The hydraulic controls of the type described usually comprise a pair of pumps furnishing fluid pressure to a piston associated with each clutch disposed to oppose the action of the springs through individual single-acting control valves. The obvious disadvantage of this arrangement is the high cost of using a multiplicity of valves and pumps to control a plurality of parts. In other present-day hydraulic systems of this type a flow divider is used in combination with a single pump to direct fluid to each of two valves which control the steering clutches. Since a flow divider system is inherently inefficient, a large capacity pump is required to supply sufficient flow.

In the environment disclosed as a specific application of this control, the device of the present invention comprises a valve housing having two valve spools slidably retained in suitable bores wherein said bores are interconnected by conduits or passages to permit actuation of one of said spools with virtually no effect on the other spools. The theory of the present invention is applicable to either open or closed-center type valves having two or more valve spools. It is, therefore, an object of this invention to provide a valve in a hydraulic circuit through which fluid may be directed to any one of a plurality of controlled parts, and wherein said circuit is charged by a single pump.

Another object of this invention is to provide a valve of the type described effective to produce the above mentioned function without the use of a flow divider, thus reducing the pump capacity requirements.

Another object of this invention is to provide an open-center hydraulic control unit with independently operated, series connected valves. Another object of this invention is in the provision of a multi-valved hydraulic control member having split parallel inlet passages which afford control of individually unrelated components without reflecting such function on the parts being controlled by the other of said valves.

Another object of this invention resides in the reaction piston associated with each valve of the type described which modulates the pressure condition existing in the controlled part by opposing the force of a spring incorporated in the manual control for the positioning of the hydraulic valve.

Another object of this invention is the relief valve function of the reaction piston which limits the degree of pressure build-up on the actuating piston of the clutch.

An important object of this invention is the provision of a hydraulic control unit having a plurality of valves joined in series by suitable conduits whereby actuation of one of said valves produces the function of a combined reducing and relief valve, and wherein actuation of a second valve simultaneously and downstream of said first valve causes the upstream valve to function as a reducing valve and the downstream valve to function as a relief valve.

Further objects and advantages of this invention will be made apparent from the following specification wherein reference is made to the accompanying drawing.

In the drawing:

FIG. 1 is a view in perspective of an open-center valve embodying the present invention with parts broken away to illustrate the structural details thereof;

FIG. 2 is a plan view of the same valve with parts broken away in horizontal section illustrating the relative positions of the components thereof; and FIG. 3 is a vertical sectional view of a closed-center valve embodying the same invention.

Referring to FIG. 1, the hydraulic control unit shown generally at 10 comprises a valve housing 11 having a plurality of elongated bores, one of which is indicated 13. A plurality of valve spools, one of which is indicated 14, are slidably mounted in the bores 13. Valve spool 14 is provided with a plurality of spaced collars 16, 17, and 18 which upon sliding movement of the spool are adapted to cooperate with spaced recesses 19, 21, 22, and 23 to direct fluid from the pump through the control valve in a manner presently to be described.

Sliding movement of the spool 14 is accomplished by means of a lever 24, forming a part of the manual control linkage (not shown). Lever 24 is secured to a shaft 26 rotatably journalled in a suitable boss 27 of said valve. A second lever 28 fixed to shaft 26 carries a roller 29 which contacts the end of a plunger 30 telescoped within the spool 14.

Spool 14 is moved by actuation of lever 24 through resilient means in the form of a captive spring 31 contained within suitable bores 32 and 33 provided in the spool and plunger 14 and 30 respectively. Valve spool 14 is normally urged toward its neutral position illustrated in FIG. 1 by a spring 34 acting between the end of spool 14 and a wall 36 of housing 11.

Depending upon the number of devices to be controlled the valve may be provided with a plurality of spools 14, but as illustrated in FIG. 2 of the drawings comprises a second spool 14a of like configuration slidably disposed in a bore 13a similar to bore 13. Spool 14a is provided with control means illustrated herein as a lever 24a and the actuating mechanism is identical to that shown for spool 14.

Although a valve of this type may be adapted to control various elements the preferred embodiment herein illustrated is designed for the control of steering clutches for track-type tractors wherein said clutches are normally engaged by spring pressure and wherein the control of the present invention provides pressure to fluid motors arranged to oppose the forces of the clutch springs for disengaging one or the other clutch selectively by manipulation of either control lever 24 or 24a. The valve may be used to slip or disengage both said clutches simultaneously by actuation of both levers 24 and 24a.

To supply the hydraulic fluid a pump (not shown) driven in any suitable manner by the engine of the tractor supplies fluid from a tank or reservoir, such as the final drive case (not shown), to an inlet 37 formed in housing 11. Referring also to FIG. 2, inlet 37 opens into a large cavity 38 adjacent spool 14a which is connected to recess 22 through a conduit in the form of a passage 39. A second passage 41 virtually parallel to passage 39 conducts the flow of oil from recess 38 to a discharge opening 42 associated with recess 19 to direct the flow through lubrication passages while the valves are both in a neutral position illustrated by the position of spool 14a in FIG. 2.

In operation the open-center valve illustrated in FIGS. 1 and 2 functions as follows: Fluid pressure enters the valve through inlet 37 and flows through passages 39 and 41, then through discharge passage 19 and port 42. The flow of oil passing through port 42 may be directed to actuate an auxiliary control but in the preferred embodiment disclosed is directed to cool the clutch plates and lubricate the bearings of the drive mechanism of the tractor through suitable conduits (not shown). With the valves in a neutral position both steering clutches are engaged by the force of clutch springs associated with each steering clutch of the tractor. When it is desirable to steer the tractor towards the right, for instance, lever 24 is rotated in a clockwise direction about the axis of shaft 26, moving spool 14 to the left through the resilience of spring 31. This movement of the spool positions collars 17 and 18 to uncover recesses 22 and 23 admitting fluid from passage 39 into recess 23 and consequently into a port 44 (see FIG. 1) leading to the piston of the fluid motor associated with the right-hand steering clutch of the tractor.

The flow of oil to the piston of the steering clutch results in a pressure build-up which is sensed in a reaction chamber 46 containing a piston 47 cooperating with a bore 48 provided in the end of each spool. Fluid at the pressure existing in the clutch is admitted into chamber 46 of the reaction piston through an orifice 48 connecting recess 23 with said chamber, whereby the pressure acting on the clutch piston is modulated when the pressure condition existing in chamber 46 overcomes the force of spring 31 and moves spool 14 towards the right, as shown in FIG. 1, to maintain a desired minimum level of actuating pressure on the clutch piston.

Means may be provided for regulating the initial load of spring 31 in opposition to the pressure condition in chamber 46. To this end a set screw 51 may be threadably engaged in the closed end of plunger 30 to contact a spring seat 52, whereby the preload on spring 31 may be adjusted in order to establish the proper force differential between the spring and fluid pressure and thereby maintain a desired actuating pressure on the clutch piston for disengaging the clutch.

In order to provide operator feel of the condition of the controlled part and to eliminate valve chattering resulting from critical pressure changes in manipulating the valves, the collars 18 and 18a preferably provided with throttling slots in the form of arcuate grooves 53 which reduce the valve opening area when the valve is initially moved so as to permit a longer range of movement of control lever 24 or 24a in operating one or the other of said steering clutches. Similar throttling slots 54 are provided in one edge of collars 16 and 16a so as to control the rate at which the flow of oil is discharged through passage 19. It should be pointed out that passage 19 may direct lubricant to the various bearing areas of the clutch and final drive of the tractor.

As soon as the operator has completed the turn the lever 24 is returned to its neutral position under the influence of spring 31 extending the telescoped spool 14 and plunger 30 at which time spring 34 moves spool 14 towards the right to the neutral position of the control. With the valve in this position the pressure acting on the piston of the clutch is drained through the valve via port 44 or port 44a, slots 53, and into a cavity 56 defined in the valve housing and enclosed by the end plate 36. Contained in cavity 56 is a standpipe 57 establishing a level of oil in said cavity. This oil supply maintains the valve bores, recesses, and ports filled with oil to prevent air from becoming entrained therein. The surplus oil is returned to the sump through the inner passage of standpipe 57.

With the arrangement described a plurality of valves functioning to modulate pressure or to relieve pressure at a certain level may be used to control a plurality of devices. In this design any one or combination of valves may be operated to control certain of these devices without supplying pressure to the other of said controlled devices because of the parallel inlet passages that connect all valve chambers together in series.

This system is further applicable to a closed-center type valve with minor modifications to the design of the spool. A preferred embodiment of a closed-center type valve is disclosed in FIG. 3 wherein a spool 14b having spaced collars 17b and 18b is slidably retained in a cylindrical bore 13b of the valve housing 11b. The manual operating controls for this valve are identical to those previously described whereby the valve is positioned through the resilience of a spring 31b acting between a plunger 30b telescoped with respect to the valve 14b. A closed-center valve functions to restrict the build-up of pressure to the load at a certain level by metering the valve opening leading to the load chamber providing the function of a reducing valve. An open-center valve, on the other hand, functions as a relief valve to control the amount of pressure acting on the load by venting a percentage of the oil flow depending on the relative forces between the reaction piston and the spring 31.

Where a gang of such valves are required to operate a plurality of controls it is sometimes necessary to provide an accumulator which may be charged or preloaded as by a nitrogen charged piston to maintain a sufficient supply of pressurized fluid in readiness. To this end a port 44b connected with the inlet chamber 23b of the valve may have associated therewith an accumulator (not shown) containing a sufficient volume of fluid appropriately charged to maintain a desired level of pressure. In this arrangement the accumulator is charged while the control is in a neutral position whereby the inlet passage 23b is directly connected with the accumulator. Upon actuation of the load or, more specifically, for disengagement of the clutch, a sufficient volume of fluid is borrowed from the accumulator which flows through port 44c to actuate the fluid motor associated with the clutch. As the control is returned to its neutral position the spent fluid is returned to the tank through chamber 56b and standpipe 57b, as previously described, at which time the accumulator is recharged with make-up oil.

I claim:
1. In a hydraulic control valve comprising a valve housing having a plurality of cylindrical bores therein, a valve spool slidably retained in each said bore, a fluid inlet opening, a pair of conduits connected to said opening and joining said bores and terminating in separate discharge openings, whereby actuation of one of said valve spools directs the flow of fluid through the other of said valve spools independently with respect to the relative positions of said other valve spools, means to actuate each valve to direct fluid to a part to be controlled including a plunger slidable coaxially of the valve and a spring between the plunger and the valve, and a reaction piston associated with each spool reflecting the pressure condition of the part being controlled against the force of said spring.

2. In a hydraulic control valve comprising a valve housing having a plurality of cylindrical bores therein, a valve spool slidably retained in each said bore, a fluid inlet opening, a pair of conduits connected to said opening and joining said bores and terminating in separate discharge openings, whereby actuation of one of said valve spools directs the flow of fluid through the other of said valve spools independently with respect to the relative positions of said other valve spools, means to actuate each valve to direct fluid to a part to be controlled including a plunger slidable coaxially of the valve and a spring between the plunger and the valve, and a reaction piston associated with each spool reflecting the pressure condition of the part being controlled against the force of said spring to move the spool to modulate pressure within the housing and to control the relief of pressure from the housing.

3. In a hydraulic control valve comprising a valve housing having a plurality of cylindrical bores therein, a valve spool slidably retained in each said bore, a fluid inlet opening, a pair of conduits connected to said opening and joining said bores and terminating in separate discharge openings, whereby actuation of one of said valve spools directs the flow of fluid through the other of said valve spools independently with respect to the relative positions of said other valve spools, means to actuate each valve to direct fluid to a part to be controlled including a plunger slidable coaxially of the valve and a spring between the plunger and the valve, and a reaction piston associated with each spool reflecting the pressure condition of the part being controlled against the force of said spring to move the spool to modulate pressure within the housing and to control the relief of pressure from the housing and wherein the balance of hydraulic/spring force results in a gradually increasing effort to the operator in response to increased fluid pressure acting on the controlled part as the manual control position is advanced.

4. In a hydraulic control valve comprising a valve housing having a plurality of cylindrical bores therein, a valve spool slidably retained in each said bore, a fluid inlet opening, a pair of conduits connected to said opening and joining said bores and terminating in separate discharge openings, whereby actuation of one of said valve spools directs the flow of fluid through the other of said valve spools independently with respect to the relative positions of said other valve spools, means to actuate each valve to direct fluid to a part to be controlled including a plunger slidable coaxially of the valve and a spring between the plunger and the valve, and a reaction piston associated with each spool reflecting the pressure condition of the part being controlled against the force of said spring to move the spool to modulate pressure within the housing and to control the relief of pressure from the housing and wherein the balance of hydraulic/spring force results in a gradually increasing effort to the operator in response to increased fluid pressure acting on the controlled part as the manual control position is advanced and means in said discharge line to maintain the lines and passages of said control relatively completely full of oil so as to maintain said circuit free of air thereby assuring a positive response to said control.

References Cited in the file of this patent

UNITED STATES PATENTS

| | | |
|---|---|---|
| 2,247,141 | Twyman | June 24, 1941 |
| 2,392,422 | Stephens | Jan. 8, 1946 |
| 2,483,651 | Lee | Oct. 4, 1949 |
| 2,501,328 | Gurries | Mar. 21, 1950 |
| 2,586,932 | Gardiner et al. | Feb. 26, 1952 |
| 2,804,883 | Curlett | Sept. 3, 1957 |
| 2,837,167 | Loofbourrow | June 3, 1958 |